United States Patent
Kocsis et al.

(10) Patent No.: US 10,767,012 B2
(45) Date of Patent: Sep. 8, 2020

(54) FUNCTIONALIZED POLYAMIDES AND METHODS OF PREPARING THE SAME

(71) Applicant: Firestone Fibers & Textiles Company, LLC, Kings Mountain, NC (US)

(72) Inventors: Laura S. Kocsis, Copley, OH (US); William L. Hergenrother, Akron, OH (US); Terrence E. Hogan, Uniontown, OH (US); Kevin J. Bishop, Copley, OH (US); Waruna C. B. Kiridena, Copley, OH (US)

(73) Assignee: Firestone Fibers & Textiles Company, LLC, Kings Mountain, NC (US)

( * ) Notice: Subject to any disclaimer, the term of this patent is extended or adjusted under 35 U.S.C. 154(b) by 214 days.

(21) Appl. No.: 15/949,784

(22) Filed: Apr. 10, 2018

(65) Prior Publication Data

US 2018/0291152 A1   Oct. 11, 2018

Related U.S. Application Data

(60) Provisional application No. 62/483,532, filed on Apr. 10, 2017.

(51) Int. Cl.
| | |
|---|---|
| *C08G 69/48* | (2006.01) |
| *C08G 69/16* | (2006.01) |
| *C08G 69/42* | (2006.01) |
| *B60C 9/00* | (2006.01) |
| *C08G 69/26* | (2006.01) |

(52) U.S. Cl.
CPC ............ *C08G 69/48* (2013.01); *C08G 69/16* (2013.01); *C08G 69/42* (2013.01); *B60C 9/0042* (2013.01); *C08G 69/26* (2013.01); *C08G 2380/00* (2013.01)

(58) Field of Classification Search
None
See application file for complete search history.

(56) References Cited

U.S. PATENT DOCUMENTS

| | | | |
|---|---|---|---|
| 3,386,967 A | 6/1968 | Twilley et al. | |
| 3,445,408 A * | 5/1969 | Gabris ................... | C08G 69/34 528/324 |
| 3,558,567 A | 1/1971 | Twilley | |
| 3,882,085 A | 5/1975 | Schmitt et al. | |
| 3,966,866 A | 6/1976 | Ballman et al. | |
| 3,987,141 A | 10/1976 | Martin | |
| 4,061,621 A | 12/1977 | Lofquist et al. | |
| 4,215,176 A | 7/1980 | Tuller et al. | |
| 4,322,480 A | 3/1982 | Tuller et al. | |
| 4,478,978 A | 10/1984 | Roura | |
| 4,564,650 A | 1/1986 | Hochberg et al. | |
| 4,844,834 A | 7/1989 | Dellinger | |
| 5,284,917 A | 2/1994 | Yamamoto et al. | |
| 5,859,148 A | 1/1999 | Borggreve et al. | |
| 5,917,004 A | 6/1999 | Liedloff | |
| 6,051,312 A | 4/2000 | Arnauts et al. | |
| 6,060,580 A | 5/2000 | Nijenhuis et al. | |
| 6,160,080 A | 12/2000 | Cucinella et al. | |
| 6,498,217 B1 | 12/2002 | Marek et al. | |
| 6,930,165 B2 | 8/2005 | Peduto et al. | |
| 2010/0113657 A1 | 5/2010 | Seki | |
| 2010/0261818 A1 | 10/2010 | Seki | |
| 2010/0261819 A1 | 10/2010 | Seki | |
| 2011/0257313 A1 | 10/2011 | Seki | |
| 2012/0245282 A1 | 9/2012 | Speroni et al. | |
| 2013/0281654 A1 | 10/2013 | Di Silvestro et al. | |

FOREIGN PATENT DOCUMENTS

| | | | |
|---|---|---|---|
| EP | 0682057 | | 11/1995 |
| EP | 0823457 | | 11/1998 |
| JP | 48033985 B | * | 10/1973 |
| KR | 20120128747 A | * | 11/2012 |
| WO | 8901961 | | 3/1989 |
| WO | 9635739 | | 11/1996 |

OTHER PUBLICATIONS

Lu; Chemical modification of polyamide 6 by chain extension with terephthaloyl-biscaprolactam; J. Macromol. Sci., Part B; Physics 2010; vol. 50, No. 2.

Zhu, et al.; Synthesis and characterization of star-branched polyamide 6 via anionic ring-opening polymerization with N,N',N''-trimesoyltricaprolactam as a multi-functional activator; Chinese Chem. Letters 2015; 26m 1389-1392.

Chang, et al.; Anionic Polymerization of Star-Shaped Nylon 6 with a Trifunctional Initiator, Journal of Polymer Science Part A: Polymer Chemistry, 1989, vol. 27, pp. 3637-3649.

Risch, et al.; Crystallization kinetics and morphological features of star-branched nylon-6: effect of branch-point functionality; Polymer, 1993, vol. 34, No. 11.

Wan, et al.; Elucidating isothermal crystallization behaviors of nylon-11s. Influence of star-chain branching, Thermochimica Acta 544, 2012, pp. 99-104.

Warakomski; Synthesis and Properties of Star-Branched Nylon 6, Chem. Mater, 1992, vol. 4, pp. 1000-1004.

Feldmann et al.; Molekulargewicht, Umsatz und relative Losungsviskositat bei der hydrolytischen Polymerisation von Laurinlactam, Die Angewandte Makromolekulare Chemie, 1973, vol. 34, pp. 135-152.

(Continued)

*Primary Examiner* — Rachel Kahn
*Assistant Examiner* — Ha S Nguyen
(74) *Attorney, Agent, or Firm* — Meredith E. Hooker; J. Gregory Chrisman

(57) ABSTRACT

A functionalized polyamide is prepared by reacting a thio acid with an amide monomer or a mixture of a diamine and a dicarboxylic acid. In the reaction, the amide monomer is preferably a lactam compound, the thio acid has a formula of HOOC-A-SH wherein A represents an alkylene group containing from 1 to 10 carbon atoms, the diamine is an aliphatic diamine and the dicarboxylic acid is a aliphatic dicarboxylic acid. The functionalized polyamide can be vulcanized directly with rubber, which results in the use of less dip for adhering the tire cord to the rubber.

20 Claims, No Drawings

(56) References Cited

OTHER PUBLICATIONS

Wan, et al.; Preparation, melting, glass relaxation and nonisothermal crystallization kinetics of a novel dendritic nylon-11; Thermochimica Acta 524, 2011, pp. 117-127.

* cited by examiner

FUNCTIONALIZED POLYAMIDES AND METHODS OF PREPARING THE SAME

This application claims the benefit of U.S. provisional application Ser. No. 62/483,532 filed Apr. 10, 2017, the contents of which are incorporated herein in their entirety by reference.

TECHNICAL FIELD

The present disclosure relates to a functionalized polyamide and methods of preparing the same for use in tire cords. The functionalized polyamide can be crosslinked directly with rubber, which eliminates or results in the use of less adhesive solution for adhering the tire cord to the rubber.

BACKGROUND

Polyamide fiber cords are widely used as a reinforcing material for industrial rubber articles such as tires, conveyor belts, hoses, air springs and the like because they have excellent strength, durability, and heat resistance among various reinforcing cord materials.

Polyamide fiber cords are subjected to a so-called "dip treating step" in which the cords are immersed in an adhesive solution required for the adhesion between fiber and rubber, dried, and heated under tension at a high temperature near the melting point of the fiber. In addition to requiring this further dip treating step, the materials used to prepare the adhesive solution, such as resorcinol and formaldehyde, add cost and increase manufacturing time.

There is a need to decrease the amount of the adhesive material used in the dip treating step or eliminate the dip treating step from the viewpoint of weight reduction of the tire, reduced costs, and improved productivity.

It is an objective of the present disclosure to alleviate or overcome one or more difficulties related to the prior art. It has been found that functionalized polyamides can be used in tire cords that include terminal free thiols to crosslink directly with rubber, which leads to the reduction or elimination of the dip treating step.

SUMMARY

In a first aspect, disclosed is a process of preparing a functionalized polyamide. The process includes reacting at least one thio acid with (i) an amide monomer or (ii) a mixture of a diamine and a dicarboxylic acid.

In an example of aspect 1, the thio acid has the general formula HOOC-A-SH wherein A represents an alkylene group containing from 1 to 10 carbon atoms.

In another example of aspect 1, the at least one thio acid is 3-mercaptopropionic acid.

In another example of aspect 1, the amide monomer is ε-caprolactam.

In another example of aspect 1, the diamine is hexamethylene diamine and the dicarboxylic acid is adipic acid.

In another example of aspect 1, the at least one thio acid is reacted with the amide monomer or the mixture of the diamine and the dicarboxylic acid at a temperature of 150° C. to 300° C.

In another example of aspect 1, the at least one thio acid is 3-mercaptopropionic acid and the amide monomer is ε-caprolactam.

In another example of aspect 1, the at least one thio acid is 3-mercaptopropionic acid, the diamine is hexamethylene diamine, and the dicarboxylic acid is adipic acid.

In another example of aspect 1, 0.01 to 2 weight percent of the thio acid, based upon the weight of the (i) the amide monomer or (ii) the mixture of the diamine and the dicarboxylic acid, is used to prepare the functionalized polyamide.

In a second aspect, there is a functionalized polyamide that includes a terminal free thiol prepared by a process that includes reacting at least one thio acid with (i) an amide monomer or (ii) a mixture of a diamine and a dicarboxylic acid.

In an example of aspect 2, the thio acid has the general formula HOOC-A-SH wherein A represents an alkylene group containing from 1 to 10 carbon atoms.

In another example of aspect 2, the at least one thio acid is 3-mercaptopropionic acid.

In another example of aspect 2, the amide monomer is ε-caprolactam.

In another example of aspect 2, the diamine is hexamethylene diamine and the dicarboxylic acid is adipic acid.

In another example of aspect 2, the at least one thio acid is reacted with the amide monomer or the mixture of the diamine and the dicarboxylic acid at a temperature of 150° C. to 300° C.

In another example of aspect 2, the at least one thio acid is 3-mercaptopropionic acid and the amide monomer is ε-caprolactam.

In another example of aspect 2, the at least one thio acid is 3-mercaptopropionic acid, the diamine is hexamethylene diamine, and the dicarboxylic acid is adipic acid.

In another example of aspect 2, the functionalized polyamide is a sulfur-functionalized nylon-6.

In another example of aspect 2, the functionalized polyamide is a sulfur-functionalized nylon-6,6.

In another example of aspect 2, the functionalized polyamide has a total sulfur content of at least 300 ppm.

In another example of aspect 2, 0.01 to 2 weight percent of the thio acid, based upon the weight of the (i) the amide monomer or (ii) the mixture of the diamine and the dicarboxylic acid, is used to prepare the functionalized polyamide.

In another example of aspect 2, the functionalized polyamide is used in a tire cord.

Any one of the above aspects (or examples of those aspects) may be provided alone or in combination with any one or more of the examples of that aspect discussed above; e.g., the first aspect may be provided alone or in combination with any one or more of the examples of the first aspect discussed above; and the second aspect may be provided alone or in combination with any one or more of the examples of the second aspect discussed above; and so-forth.

DETAILED DESCRIPTION

The terminology as set forth herein is for description of the embodiments only and should not be construed as limiting the invention as a whole.

Herein, when a range such as 5-25 (or 5 to 25) is given, this means preferably at least or more than 5 and, separately and independently, preferably not more than 25. In an example, such a range defines independently at least 5, and separately and independently, not more than 25.

The present disclosure relates to functionalized polyamides prepared by reacting at least one thio acid with (i) an amide monomer or (ii) a mixture of a diamine and a dicarboxylic acid. In one or more embodiments, the functionalized polyamides can be used in tire cords to cross-link with rubber, for example, in the form of a polyamide-containing fiber. In one or more embodiments, the functionalized polyamide can be cross-linked with or adhered to an elastomer without the presence of an additional adhesive therebetween. For example, the functionalized polyamide can be in direct contact with and adhered to a vulcanized elastomer composition, absent any adhesive layer or material positioned between the functionalized polyamide and elastomer composition. The elastomer composition can be any part of any rubber product, for instance, a tire, hose, belt or air spring. In one embodiment, a laminate of functionalized polyamide and an elastomer composition is provided.

Embodiments disclosed herein relate to functionalized polyamides that are prepared by reacting at least one thio acid with (i) an amide monomer or (ii) a mixture of a diamine and a dicarboxylic acid. In one or more embodiments, the functionalized polyamide is a functionalized nylon. Nylon is the generic name for a family of polyamide polymers characterized by the presence of an amine (—NH) group and an acid (—C=O) group within the monomer. Nylons can include nylon-6,6 (polyhexamethylene adipamide), nylon-6 (polycaproamide), nylon-7, nylon-8, nylon-9, nylon-10, nylon-11 (polyundecanoamide), nylon-12, nylon-6,12, nylon-6,13 and nylon-6,14.

In one or more embodiments, the thio acid contains at least one carboxyl group and at least one thiol group (mercaptan group). In one embodiment, the thio acid has the structural formula HS-A-COOH wherein A represents an alkylene group containing from 1 to 10 carbon atoms. Non-limiting examples of thio acids include thioglycolic acid (mercaptoacetic acid), thiolactic acid (2-mercaptopropionic acid), 3-mercaptopropionic acid, mercaptobutanoic acid, mercaptopentanoic acid, mercaptohexanoic acid, and any combination thereof. In other embodiments, the thio acid has the structural formula HS-A-COOH wherein A represents a cycloalkylene or arylalkylene group.

In one or more embodiments, 0.01 to 2 weight percent of the thio acid, based upon the weight of the (i) the amide monomer or (ii) the mixture of the diamine and the dicarboxylic acid, is used to prepare the functionalized polyamide. In other embodiments, the amount of the thio acid used to prepare the functionalized polyamide is 0.1 to 1.9, 0.2 to 1.8, 0.3 to 1.7, 0.4 to 1.6, or 0.5 to 1.5 weight percent, based upon the weight of the (i) the amide monomer or (ii) the mixture of the diamine and the dicarboxylic acid.

In one or more embodiments, the functionalized polyamide is prepared by reacting the at least one thio acid with an amide monomer. In one embodiment, the amide monomer is a lactam. Non-limiting examples of lactams include caprolactam, enatholactam, undecanolactam, dodecanolactam, α-pyrrolidone, and α-piperidone. One of these or two or more thereof may be used.

In further embodiments, the functionalized polyamide is prepared by reacting the at least one thio acid with a mixture of a diamine and a dicarboxylic acid. Non-limiting examples of the diamine include an aliphatic diamine, for example, ethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecamethylenediamine, tetradecamethylenediamine, pentadecamethylenediamine, hexadecamethylenediamine, heptadecamethylenediamine, octadecamethylenediamine, nonadecamethylenediamine, eicosamethylenediamine, 2-/3-methyl-1,5-pentanediamine, 2-methyl-1,8-octanediamine, 2,2,4-/2,4,4-trimethylhexamethylenediamine, and 5-methyl-1,9-nonanediamine; an alicyclic diamine, for example, 1,3-/1,4-cyclohexanediamine, 1,3-/1,4-cyclohexanedimethylamine, bis(4-aminocyclohexyl)methane, bis(4-aminocyclohexyl)propane, bis(3-methyl-4-aminocyclohexyl)methane, bis(3-methyl-4-aminocyclohexyl)propane, 5-amino-2,2,4-trimethyl-1-cyclopentanemethylamine, 5-amino-1,3,3-trimethylcyclohexanemethylamine (isophoronediamine), bis(aminopropyl)piperazine, bis(aminoethyl)piperazine, norbornanedimethylamine, and tricyclodecanedimethylamine; and an aromatic diamine, for example, m-/p-xylylenediamine. One of these or two or more thereof may be used. Non-limiting examples of the dicarboxylic acid include an aliphatic dicarboxylic acid, for example, adipic acid, pimelic acid, suberic acid, azelaic acid, sebacic acid, undecanedicarboxylic acid, dodecanedicarboxylic acid, tridecanedicarboxylic acid, tetradecanedicarboxylic acid, pentadecanedicarboxylic acid, hexadecanedicarboxylic acid, octadecanedicarboxylic acid, and eicosanedicarboxylic acid; an alicyclic dicarboxylic acid, for example, 1,3-/1,4-cyclohexanedicarboxylic acid, dicyclohexanemethane-4,4'-dicarboxylic acid, and norbornanedicarboxylic acid; and an aromatic dicarboxylic acid, for example, isophthalic acid, terephthalic acid, and 1,4-/2,6-/2,7-naphthalenedicarboxylic acid. One of these or two or more thereof may be used.

In one or more embodiments, the ratio of diamine and dicarboxylic acid in the reactions ranges from 1:99 to 99:1. In other embodiments, the ratio of diamine and dicarboxylic acid in the reaction ranges from 20:80 to 80:20, 30:70 to 70:30, 40:60 to 60:40, 42:58 to 58:42, 44:56 to 56:44, 46:54 to 54:46, 48:52 to 52:48, or 50:50.

In one or more embodiments, the reaction of at least one thio acid with (i) an amide monomer or (ii) a mixture of a diamine and a dicarboxylic acid is carried out at a temperature which is within the range of about 150° C. to about 300° C. In other embodiments, the reaction is carried out at a temperature of about 160° C. to about 290° C., about 170° C. to about 280° C., about 180° C. to about 270° C., or about 190° C. to about 260° C. In other embodiments, the reaction is carried out at a temperature which is at least as high as the melting point of the amide monomer.

The present disclosure also relates to a method of determining the modification efficiency of the reaction and sulfur content of the disclosed functionalized polyamides. The method includes the use of spectrometry to analyze reaction products, e.g., an extract and precipitate of the reaction product. Spectrometry can be carried out by any suitable device capable of detecting sulfur, for example, inductively coupled plasma-optical emission spectrometry. The method includes detecting both bound and unbound sulfur in the reaction product. For example, the method can include extracting bound and unbound sulfur from the functionalized polyamide. After extraction, the liquid phase can be analyzed by spectrometry, e.g., inductively coupled plasma-optical emission spectrometry, to measure the unbound sulfur content. Precipitate containing bound sulfur can be separated from the liquid phase. The precipitate can be dried and redissolved in a solvent to measure the bound sulfur content by inductively coupled plasma-optical emission spectrometry.

In one or more embodiments, the amount of bound sulfur of the functionalized polyamide is measured by dissolving the functionalized polyamide in a suitable solvent, for example, 2,2,2-trifluoroethanol or formic acid, followed by extraction with water. The amount of unbound sulfur is determined by analyzing the liquid phase with inductively coupled plasma-optical emission spectrometry at 180.669 nm or 181.972 nm. The amount of bound sulfur is determined by dissolving the precipitate in nitric acid and analyzing the solution with inductively coupled plasma-optical emission spectrometry at 180.669 nm or 181.972 nm. The amount of unbound sulfur and bound sulfur is then compared to the total amount of sulfur of the functionalized polyamide. The total amount of sulfur in the functionalized polyamide is measured by dissolving the functionalized polyamide in nitric acid. The resulting solution is then analyzed with inductively coupled plasma-optical emission spectrometry at 180.669 nm or 181.972 nm. The modification efficiency, or the amount of sulfur that has been incorporated into the polyamide, can be determined by comparing the amount of detected bound sulfur to the amount of total detected sulfur of the functionalized polyamide.

In one or more embodiments, the functionalized polyamide has a total sulfur content of at least 100 ppm as measured by inductively coupled plasma-optical emission spectrometry at 180.669 nm or 181.972 nm. In other embodiments, the functionalized polyamide has a total sulfur content of at least 140, 180, 220, 260, 300, or 340 ppm as measured by inductively coupled plasma-optical emission spectrometry at 180.669 nm or 181.972 nm.

In one or more embodiments, the functionalized polyamide has a bound sulfur content of at least 90 ppm as measured by inductively coupled plasma-optical emission spectrometry at 180.669 nm or 181.972 nm. In other embodiments, the functionalized polyamide has a total sulfur content of at least 130, 170, 210, 250, 290, or 330 ppm as measured by inductively coupled plasma-optical emission spectrometry at 180.669 nm or 181.972 nm.

In one or more embodiments, the modification efficiency of the reaction, or the amount of sulfur that has been incorporated into the polyamide, is at least 85%. In other embodiments, the modification efficiency of the reaction is at least 87%, 89%, 91%, 93%, 95%, 97%, or 99%.

In one or more embodiments, the functionalized polyamide has a relative viscosity of at least 1.5 at 25° C. in 1% by weight sulfuric acid solution. In other embodiments, the functionalized polyamide has a relative viscosity of at least 1.6, 1.7, 1.8, 1.9, 2.0, 2.1, 2.2, 2.3, 2.4, or 2.5 at 25° C. in 1% by weight sulfuric acid solution. In other embodiments, the functionalized polyamide has a relative viscosity in the range of 1.5 to 5.0 at 25° C. in 1% by weight sulfuric acid solution. In other embodiments, the functionalized polyamide has a relative viscosity in the range of 1.6 to 4.9, 1.7 to 4.8, 1.8 to 4.7, 1.9 to 4.6, or 2.0 to 4.5 at 25° C. in 1% by weight sulfuric acid solution.

The functionalized polyamides of this disclosure are particularly useful in preparing tire cords that can be used to manufacture tire components. Rubber compounding techniques and the additives employed therein are generally disclosed in The Compounding and Vulcanization of Rubber, in Rubber Technology ($2^{nd}$ Ed. 1973).

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. More specifically, the particular thio acids, amide monomers, diamines, dicarboxylic acids, and other ingredients utilized in the examples should not be interpreted as limiting since other such ingredients consistent with the disclosure in the Detailed Description can utilized in substitution. That is, the particular ingredients in the compositions, as well as their respective amounts and relative amounts should be understood to apply to the more general content of the Detailed Description.

The relative viscosity was determined at 25° C. using size 200 viscometers by measuring a 1% solution of the polyamide in concentrated sulfuric acid.

Modification efficiency of sulfur was determined by comparing bound and total sulfur content using inductively coupled plasma-optical emission spectrometry at a wavelength of 180.669 nm or 181.872 nm. Bound sulfur content was determined via ICP-OES by extracting a 3 weight % solution of the polyamide in 2,2,2-trifluoroethanol or formic acid with water, followed by measuring the sulfur content of the residual dried polyamide in nitric acid. The total sulfur content was determined via inductively coupled plasma-optical emission spectrometry by dissolving non-extracted polyamide in nitric acid.

Comparative Example 1

Molten ε-caprolactam (152.9 g) was charged into a glass vessel. The vessel was sealed and purged with nitrogen. n-Butylamine (0.40 mL), acetic acid (0.23 mL), water (0.62 mL), and phosphoric acid (14 µL of a 7.2 M solution in water) were then charged into the vessel. The vessel was then placed in a nitrogen-purged oven and heated to 260° C. for 16 hours. The polymerization mixture was cooled to 23° C. and then ground to a powder with the following properties: relative viscosity=1.94 and total sulfur=28 ppm. The total sulfur (28 ppm) is within the baseline limitation of the instrument.

Example 2

Molten ε-caprolactam (149.0 g) was charged into a glass vessel. The vessel was sealed and purged with nitrogen. n-Butylamine (0.39 mL), 3-mercaptopropionic acid (0.35 mL), water (0.61 mL), and phosphoric acid (14 µL of a 7.2 M solution in water) were then charged into the vessel. The vessel was then placed in a nitrogen-purged oven and heated to 260° C. for 16 hours. The polymerization mixture was cooled to 23° C. and then ground to a powder with the following properties: relative viscosity=2.02, total sulfur=340 ppm, bound sulfur (extraction with 2,2,2-trifluoroethanol)=330 ppm (97% modification efficiency), and bound sulfur (extraction with formic acid)=310 ppm (91% modification efficiency).

The properties of the polyamides of Comparative Example 1 and Example 2 are shown in Table 1.

TABLE 1

| | Comparative Example 1 | Example 2 |
|---|---|---|
| Terminator | Acetic acid | 3-mercaptopropionic acid |
| Relative Viscosity | 1.94 | 2.02 |
| Total Sulfur (ppm) | 28 | 340 |
| Bound sulfur (ppm) (2,2,2-trifluoroethanol) | 0 | 330 |
| Modification (%) (2,2,2-trifluoroethanol) | 0 | 97 |

TABLE 1-continued

| | Comparative Example 1 | Example 2 |
|---|---|---|
| Bound sulfur (ppm) (formic acid) | 0 | 310 |
| Modification (%) (formic acid) | 0 | 91 |

As can be seen in Table 1, the relative viscosity of the functionalized polyamide with a free thiol of Example 2 was 2.02. In comparison, the relative viscosity of the polyamide of Comparative Example 1 was 1.94. The modification efficiency of the functionalized polyamide was 91% as measured in formic acid and 97% as measured in 2,2,2-trifluoroethanol. The levels of bound sulfur and the modification efficiencies indicate that the 3-mercaptopropionic acid was incorporated onto the polyamide.

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A process of preparing a functionalized polyamide comprising reacting a thio acid with (i) an amide monomer or (ii) a mixture of a diamine and a dicarboxylic acid, wherein the thio acid has the general formula HOOC-A-SH wherein A represents an alkylene group containing from 2 to 10 carbon atoms, further wherein 0.01 to 2 weight percent of the thio acid, based upon the weight of the (i) the amide monomer or (ii) the mixture of the diamine and the dicarboxylic acid, is used to prepare the functionalized polyamide.

2. The process of claim 1, wherein the thio acid is 3-mercaptopropionic acid.

3. The process of claim 1, wherein the amide monomer is ε-caprolactam.

4. The process of claim 1, wherein the diamine is hexamethylene diamine and the dicarboxylic acid is adipic acid.

5. The process of claim 1, wherein the thio acid is reacted with the amide monomer or the mixture of the diamine and the dicarboxylic acid at a temperature of 150° C. to 300° C.

6. The process of claim 1, wherein the thio acid is 3-mercaptopropionic acid, the amide monomer is ε-caprolactam, the diamine is hexamethylene diamine, and the dicarboxylic acid is adipic acid.

7. The process of claim 1, wherein 0.1 to 0.5 weight percent of the thio acid, based upon the weight of the (i) the amide monomer or (ii) the mixture of the diamine and the dicarboxylic acid, is used to prepare the functionalized polyamide.

8. A functionalized polyamide comprising a terminal free thiol prepared by a process comprising reacting a thio acid with (i) an amide monomer or (ii) a mixture of a diamine and a dicarboxylic acid, wherein the thio acid has the general formula HOOC-A-SH wherein A represents an alkylene group containing from 2 to 10 carbon atoms, further wherein 0.01 to 2 weight percent of the thio acid, based upon the weight of the (i) the amide monomer or (ii) the mixture of the diamine and the dicarboxylic acid, is used to prepare the functionalized polyamide.

9. The functionalized polyamide of claim 8, wherein the thio acid is 3-mercaptopropionic acid.

10. The functionalized polyamide of claim 8, wherein the amide monomer is ε-caprolactam.

11. The functionalized polyamide of claim 8, wherein the diamine is hexamethylene diamine and the dicarboxylic acid is adipic acid.

12. The functionalized polyamide of claim 8, wherein the thio acid is reacted with the amide monomer or the mixture of the diamine and the dicarboxylic acid at a temperature of 150° C. to 300° C.

13. The functionalized polyamide of claim 8, wherein the thio acid is 3-mercaptopropionic acid, the amide monomer is ε-caprolactam, the diamine is hexamethylene diamine, and the dicarboxylic acid is adipic acid.

14. The functionalized polyamide of claim 8, wherein the functionalized polyamide is a sulfur-functionalized nylon-6.

15. The functionalized polyamide of claim 8, wherein the functionalized polyamide is a sulfur-functionalized nylon-6,6.

16. The functionalized polyamide of claim 8, wherein the functionalized polyamide has a total sulfur content of at least 300 ppm.

17. The functionalized polyamide of claim 8, wherein 0.1 to 0.5 weight percent of the thio acid, based upon the weight of the (i) the amide monomer or (ii) the mixture of the diamine and the dicarboxylic acid, is used to prepare the functionalized polyamide.

18. A tire cord comprising a cord comprising the functionalized polyamide of claim 8.

19. The process of claim 1, wherein 0.1 to 0.5 or less weight percent of the thio acid, based upon the weight of the (i) the amide monomer or (ii) the mixture of the diamine and the dicarboxylic acid, is used to prepare the functionalized polyamide, and wherein the functionalized polyamide is a functionalized nylon having a total sulfur content of at least 300 ppm.

20. The functionalized polyamide of claim 8, wherein 0.1 to 0.5 or less weight percent of the thio acid, based upon the weight of the (i) the amide monomer or (ii) the mixture of the diamine and the dicarboxylic acid, is used to prepare the functionalized polyamide, and wherein the functionalized polyamide is a functionalized nylon having a total sulfur content of at least 300 ppm.

* * * * *